2,911,303
PEANUT BUTTER PRODUCT

George H. Rowland and Charles W. Williams, Jr., Denison, Tex., assignors to Safeway Stores, Incorporated, Oakland, Calif., a corporation of Maryland No Drawing. Application November 12, 1957
Serial No. 695,536

3 Claims. (Cl. 99—128)

This invention relates generally to nut butters and methods for their manufacture. More particularly it pertains to peanut butter comprising comminuted nut solids and oil, and which is useable as a bread spread.

It is well known that peanut butter made without stabilization of the oil content is subject to oil separation on standing. In commercial products this has been overcome by adding a highly hydrogenated vegetable fat, which serves to make the product stiffer at normal temperatures. However, the resulting butter has the disadvantage that it is difficult to spread and tends to cling to the palate when eaten.

In general, it is an object of the present invention to provide an improved stabilized peanut butter which is not subject to oil sepaparation, and which has good platability, smoothness and spreadability over a relatively wide temperature range.

A further object is to provide an improved method for the manufacture of peanut butter.

Additional objects and features of the invention will appear from the following description:

In accordance with the present invention a stabilized peanut butter is formed by adding thereto an edible blend of a fully hydrogenated or saturated fat and unsaturated liquid oil characterized by a substantially uniform solids content over a wide range of temperatures. Preferably the saturated fat is first dispersed in a suitable unsaturated liquid oil to achieve a blend of a definite solids content, for example, as indicated by solid fat index values, and the resulting blend added to the peanut butter. Our stabilized peanut butter is not subject to serious oil separation, it is smooth, of equal consistency, and readily spreadable at all temperatures within a range from about 40° F. to about 120° F., and it does not tend to cling to the palate when eaten. We attribute these properties to the controlled solids content and the superior stabilizing effect of the fat-oil stabilizer blend, in contrast to the variable solids content (with variations in temperature) and stiffness imparted by highly hydrogenated vegetable oils.

Various techniques can be used to incorporate the fat-oil stabilizer blend in the peanut butter. It is possible to introduce the fat-oil stabilizer blend directly into the grinding and milling equipment being employed for the manufacture of the peanut butter. However, the preferred procedure is to subject the roast peanuts to conventional grinding and milling to form a butter having particles of the desired size, and thereafter introduce a fat-oil blend having a desired predetermined solids content. Conventional grinding and milling of the roast peanuts generates considerable heat whereby the butter is discharged at an elevated temperature of about 140° to 175° F. It has been found desirable to continuously pass the hot peanut butter, after the stabilizer blend has been added, through a high flow velocity heat exchanger, whereby the material is rapidly cooled to a temperature of the order of from 70° to 90° F. (optimum 75° to 80° F.). Thereafter the peanut butter is introduced into jars or like containers.

Various additives can be used, such as salt and a sweetening agent like dextrose. In particular the addition of honey has been found to increase flavor and to assist the stabilizer blend in preventing oil separation.

In carrying out the invention the fat and liquid oil should be carefully blended to a controlled solids content. We prefer to blend the saturated and unsaturated oil fat to a solid fat index value within a desired range as determined by the tentative American Oil Chemists Society method. Solid fat index values of blends providing the desired stability and spreadability to nut butters within a normal temperature range are set forth in Table I, and indicate a preferred range of from 10 to about 15. In general, stabilizer blends having values of about 11 at higher temperatures to about 14 at lower temperatures will provide the best results.

TABLE I

Solid fat index values

| Temperature, ° F | Effective Range | Optimum |
|---|---|---|
| 50 | 10.5 to 17.0 | 14.0 |
| 70 | 10.0 to 16.0 | 13.5 |
| 92 | 10.0 to 16.0 | 13.5 |
| 100 | 9.5 to 15.0 | 13.0 |
| 113 | 7.5 to 13.0 | 11.5 |

Butters prepared using stabilizer blends of the above characteristics, in amounts ranging from about 10% to 25% of the blend in the final product, demonstrate a remarkable uniformity of spreadability over a wide temperature range, as determined both by actual test and by penetration tests employing an A.S.T.M. cone-type penetrometer.

Any normally solid edible substantially saturated triglyceride, either natural or synthetic, may be used in the process of this invention, and preferably should be at least 70% hydrogenated. Examples of natural fat materials are substantially completely hydrogenated peanut oil, lard oil, olive oil, corn oil, cottonseed oil, sunflower seed oil, linseed oil, hazelnut oil, palm oil, whale oil, fish oil, tallow and the like. Examples of synthetic fat materials are hydrogenated tri-stearine, tri-olein, tri-palmitin, stearo-dipalmitin, oleo-distearine, and the like. Because of a combination of desirable properties, a stearine of vegetable origin, particularly cottonseed stearine, is to be preferred. Materials which we have used with good results have titers varying from about 58° C. to about 61° C.

The oil used for the stabilizer blend should be free from objectionable odors or flavor, edible, and liquid at temperatures of the order of 40° to 45° F., and may include a wide variety of edible animal and vegetable oils such as cotton-seed, olive, soybean, and corn oil, etc. Vegetable oils, and particularly cottonseed and soybean oils, are to be preferred. A typical cottonseed oil which we have used has an iodine value of 110, free fatty acid content of 0.02, and a negative peroxide value. Also we have employed a soybean oil, having an iodine value of 130, a free fatty acid content of 0.02, and a negative peroxide value. The results obtained from use of cottonseed oil have been deemed somewhat superior to those obtained with the soybean product.

In a preferred stabilizer blend for adding to the peanut butter, the amount of stearine employed may vary from about 2.0% to 4.0% by weight, of the peanut butter blend. The proportion of the stearine and oil in the stearine-oil blend may vary over a range of from about 13% to 18% stearine to about 87% to 82% vegetable oil, optimum proportions being dependent of course upon the controlled solids content, previously mentioned. Desired blends can be readily prepared by introducing the stearine in appropriate amounts into the liquid oil, and then heating to a temperature of the order of 140° F., with agitation to produce a liquid material substantially free from crystals.

Typical examples of our method and product are as follows:

EXAMPLE 1

Grinding and milling equipment was used such as is employed for the manufacture of conventional peanut butter. Number 2 grade roast peanuts were supplied to the primary grinder, together with 1.8% salt and 3% dextrose. The butter was withdrawn from the secondary mill at 145° F. A fat-oil stabilizer comprising 15% 58.3° C. titer deodorized cottonseed stearine and 85% cottonseed salad oil was blended to a solid fat index value of about 14 (50° F.), and was introduced into the secondary mill at about 140° F., in an amount sufficient to provide 20% of the blend in the final product. The material from the secondary mill was introduced into hot jars and samples tempered at 60° F., 75° F., for 15 hours. After storage for one week at 100° F., the samples showed no oil separation. All samples had excellent spreadability from ice box temperature to 100° F.

EXAMPLE 2

Peanut butter prepared as in Example 1, before cooling, was subjected to rapid cooling by being passed through a heat exchanger of the high velocity flow type. The equipment employed was that known by the trade name of Votator, manufactured by The Girdler Company. During this Votator treatment, the material was cooled to a temperature of the order of 85° F. Thereafter the material was placed in jars. Samples tempered at 60° F., 75° F. overnight and then stored at 100° F. were examined after six months, and showed no visible indications of oil separation. Samples when opened had a shiny appearance as distinguished from the dull surface appearance of samples from Example 1, and in general appeared to be somewhat more stable and smoother with excellent spreadability over a wide range of temperatures (40° F. to 100° F.).

EXAMPLE 3

Peanut butter was milled and a stabilizer blend added in the same manner as in Example 1. However, No. 1 grade peanuts were used. One portion of this material was subjected to the rapid cooling treatment as in Example 2, and then samples tempered at 60° F., 75° F. About 3% honey was added to the remaining material, and thereafter this material subjected to the rapid cooling treatment, and then samples tempered at 60° F. and 75° F.

When examined after six weeks, all of the samples had remained stable with respect to oil separation. The peanut butter without honey showed minor oil separation after 10 weeks at 100° F., the product with honey remained stable after 6 months. All samples had good spreadability and were quite smooth.

EXAMPLE 4

130 pounds of peanut butter was prepared by conventional milling, without stabilizer, salt or other additives. A stabilizer blend was prepared consisting of 87% soybean salad oil, with 13% 60.8° C. titer cottonseed stearine. This blend had a solid fat index value of about 13 at 50° F. The stabilizer at 140° F. was slowly added with agitation to the peanut butter. The mixture was then rapidly cooled in accordance with the procedure outlined in Example 2, and removed from this processing at a temperature of 85° F. Samples were tempered at 60°, 70° and 82° F. All samples remained stable with respect to oil separation for a period of 6 months at 100° F., and all of the samples had a smooth, spreadable consistency at all temperatures within the range from 40° F. to 100° F.

EXAMPLE 5

The same procedure was followed as in Example 4, except that the stabilizer used comprised 87% cottonseed salad oil and 13% 59.3° C. titer stearine, and had a solid fat index value at 50° F. of about 14. Samples were removed from the rapid cooling step at temperatures of 81° F. and 85° F., and tempered at 60°, 70° and 82° F.

When examined at the end of 6 months at 100° F., all samples were stable with respect to oil separation, and had the desired smoothness and spreadability.

EXAMPLE 6

120 pounds of peanut butter were prepared by conventional grinding and milling, without salt, dextrose or stabilizer. To this material there was added 30 pounds of melted stabilizer blend (solid fat index value at 50° F. of 14), comprising 87% cottonseed oil and 13% 59.3° C. titer cottonseed stearine, and at a temperature of about 140° F. To 75 pounds of this mixture was added 13.2 pounds chopped peanuts and to the other 75 pounds there was added 13.2 pounds chopped peanuts and 2.7 pounds of melted creamed honey. Each of the above mixtures was subjected to the previously described rapid cooling and discharged at 85° F. Samples were stored at 70° and 82° F. for 24 hours, then placed in a 100° F. cabinet. All samples remained relatively stable over a storage period of 6 months with excellent spreadability at temperatures ranging from 40° F. to 100° F. However, the samples containing honey appeared to have greater stability.

EXAMPLE 7

The same procedure was followed as in Example 6 except that 22% by weight of chopped peanuts were added to the peanut butter mixture containing only 15% by weight of the stabilizer blend. The chopped nuts were calculated to be 7.5% by weight of the total product and quite small. In other respects the results obtained were substantially identical to those obtained by the procedure of Example 6.

EXAMPLE 8

A melted stabilizer blend comprising 87% cottonseed oil and 13% 59.3° C. titer cottonseed stearine was added to each of a separate batch of hot ground peanuts prepared by conventional milling to provide two 75 pound batches, one containing 15% stabilizer and the other 25% stabilizer by weight. To each was added 1.5 pounds dextrose and 1.25 pounds salt. The mixtures were then subjected to the previously described rapid cooling and discharged at 85° F. Samples of each were stored at 70° F. and 87° F. for 24 hours and then placed in a 100° F. cabinet. All samples remained stable with excellent spreadability over a storage period of 6 months.

The foregoing examples demonstrate some permissible variations in proportioning and ingredients. They also demonstrate the stability and characteristics of uniform spreadability imparted to nut butters by the stabilizer blends over a very substantial range of temperatures, extending from ice box temperatures of the order of 35°–40° F. to shelf temperatures of 100° F.

These examples further demonstrate the advantages to be obtained by the rapid cooling treatment. The effect of this treatment is to rapidly cool the peanut butter from the elevated temperature at which it leaves the grinding and milling equipment (e.g. 160° F.) to a lower temperature of the order of 75°–80° F., together with rapid flow velocities and agitation. It is deemed that crystallization of the stabilizer occurs during this treatment, and that the character of crystallization is controlled to produce the desired stability, while at the same time retaining the desired uniform solids content and consequent smooth-

We claim:

1. A peanut butter comprising particles of peanuts homogeneously mixed with peanut oil, the material having dispersed therein an edible stabilizer blend comprising about 80% to 90% of an unsaturated liquid oil and from 20% to 10% of a saturated vegetable fat, the amount of said stabilizer blend in the peanut butter ranging from about 10% to 25%, said blend being characterized by a virtually uniform solid fat index value between about 10 and 15 at all temperatures within the range from about 40° F. to 110° F., said butter being relatively stable with respect to oil separation, and also being uniformly palatable, smooth, and easily spreadable at all temperatures within such temperature range.

2. The peanut butter of claim 1 wherein said saturated vegetable fat is vegetable stearine and said unsaturated liquid oil is a cottonseed oil.

3. A peanut butter comprising nut particles with peanut oil, the material having dispersed therein a stabilizer blend comprising about 85% deodorized cottonseed oil, and about 15% 60° titer cottonseed stearine, the amount of the stabilizer blend being substantially 20% of the total product, said stabilizer blend being characterized by a solid fat index value between about 10 and 15 at all temperatures within a temperature range from about 40° F. to about 110° F., said peanut butter being stabilized with respect to oil separation and also being uniformly platable, smooth and easily spreadable within such temperature range.

References Cited in the file of this patent

UNITED STATES PATENTS

| | | |
|---|---|---|
| 1,395,934 | Stockton | Nov. 1, 1921 |
| 1,445,174 | Rosenfield | Feb. 13, 1923 |
| 2,079,288 | Hoffman | May 4, 1937 |

OTHER REFERENCES

"Solubility of Hydrogenated Peanut Oil in Peanut Oil," Magne et al., reprinted from the Journal of the American Oil Chemists Society, March 1954 issue, vol. XXXI, No. 3, pp. 113–114.